United States Patent
Soccoli et al.

(10) Patent No.: US 8,018,166 B2
(45) Date of Patent: Sep. 13, 2011

(54) LIGHTING CONTROL SYSTEM AND THREE WAY OCCUPANCY SENSOR

(75) Inventors: Paul Soccoli, New Hyde Park, NY (US); Michael Ostrovsky, Brooklyn, NY (US); Alfred J. Lombardi, Syosset, NY (US)

(73) Assignee: Leviton Manufacturing Co., Inc., Melville, NY (US)

( * ) Notice: Subject to any disclaimer, the term of this patent is extended or adjusted under 35 U.S.C. 154(b) by 1195 days.

(21) Appl. No.: 11/608,623

(22) Filed: Dec. 8, 2006

(65) Prior Publication Data

US 2007/0216313 A1 Sep. 20, 2007

Related U.S. Application Data

(60) Provisional application No. 60/782,989, filed on Mar. 15, 2006.

(51) Int. Cl.
*H01J 7/42* (2006.01)
*G05F 1/00* (2006.01)

(52) U.S. Cl. ........................ 315/129; 315/308

(58) Field of Classification Search .................. 315/129, 315/131, 132, 134, 149, 154, 158, 159, 307, 315/308, 312, DIG. 4
See application file for complete search history.

(56) References Cited

U.S. PATENT DOCUMENTS

| | | | | |
|---|---|---|---|---|
| 3,604,180 A * | 9/1971 | Wood | ............................ | 52/649.3 |
| 5,237,207 A * | 8/1993 | Kwiatkowski et al. | ......... | 307/31 |
| 5,489,827 A * | 2/1996 | Xia | ............................... | 315/294 |
| 5,701,058 A * | 12/1997 | Roth | ............................. | 315/158 |
| 5,753,983 A * | 5/1998 | Dickie et al. | ................ | 307/141.4 |
| 6,114,816 A * | 9/2000 | Nuckolls et al. | .............. | 315/324 |
| 6,181,086 B1 * | 1/2001 | Katyl et al. | .................... | 315/307 |
| 6,222,191 B1 * | 4/2001 | Myron et al. | ................... | 250/353 |
| 6,275,163 B1 * | 8/2001 | Bogorad et al. | ........... | 340/686.1 |
| 6,390,647 B1 * | 5/2002 | Shaefer | ......................... | 362/276 |
| 6,587,739 B1 | 7/2003 | Abrams et al. | | |
| 6,850,159 B1 * | 2/2005 | Mudge | ........................... | 340/541 |
| 6,933,686 B1 | 8/2005 | Bishel | | |
| 7,058,477 B1 * | 6/2006 | Rosen | ........................... | 700/277 |
| 7,109,668 B2 * | 9/2006 | Pogodayev et al. | ........... | 315/307 |
| 7,486,193 B2 * | 2/2009 | Elwell | ........................ | 340/573.1 |
| 2002/0135476 A1 | 9/2002 | McKinney, Jr. et al. | | |
| 2005/0254241 A1 * | 11/2005 | Harwood | ....................... | 362/231 |
| 2006/0044152 A1 * | 3/2006 | Wang | ............................. | 340/825 |

* cited by examiner

*Primary Examiner* — Douglas W Owens
*Assistant Examiner* — Minh D A
(74) *Attorney, Agent, or Firm* — Weiss & Arons, LLP (57) ABSTRACT

There is disclosed a sensor which, when integrated into a dimming system, can turn the dimmer on and off, and vice versa. As an example, lights which are connected to the dimmer can be turned on by using the dimmer, the light level can be adjusted to provide a level of illumination desired by an occupant, and the sensor can turn off the lights when the room is vacant. The sensor here disclosed provides sensing functionality to a dimming system, and the sensors can be remotely controlled by other sensors, dimmers and dimmer remotes.

30 Claims, 6 Drawing Sheets

PRIOR ART

LIGHTING CONTROL SYSTEM AND THREE WAY OCCUPANCY SENSOR

This application claims the benefit of Provisional Application Ser. No. 60/782,989 filed Mar. 15, 2006.

BACKGROUND OF THE INVENTION

1. Field of the Invention

The present invention relates generally to the field of electrical wiring devices such as, by way of example, sensors, and more specifically to a control system using sensors to automatically control the flow of power to a load.

2. Description of the Related Art

Occupancy sensors are used for both security and/or to control room illumination by automatically turning the lights on when a room is occupied and off when the room is not occupied. Sensors are usually identified by the technology they use such as passive infrared sensors, active ultrasonic sensors such as Doppler shift detection sensors, audible sound detection sensors and microwave sensors. Sensors generally have two sections, a first section for sensing and a second section for load control. The sensing section can include detection and logic circuitry, and the section for load control can include a switching element. The switching element is normally used to connect line power to a load and disconnect line power from the load. It can also function as a switch for low voltage interface.

The various types of sensors mentioned above are further identified as being either low voltage sensors or self contained sensors. Low voltage sensors have separate sensing and load control sections where the low voltage sensor is packaged as a single product that is connected to a line voltage power pack having the switching element that is packaged in another product. Self contained sensors have the sensing section and load control section packaged as a single product. Low voltage sensors are generally used in commercial properties.

Self contained sensors are manufactured as either ceiling or wall mount sensors. Ceiling mount sensors are often used in commercial buildings. Wall mount sensors are more common and are produce in both commercial and residential versions. These sensors are often referred to as wall switch sensors or wall box sensors because they are designed to fit into a standard electrical box and can replace an existing wall switch. Wall switch sensors are powered by line voltage and have either a triac or mechanical relay which is used to disconnect line voltage from a load.

For retrofit installations in commercial buildings, it is generally not acceptable to require a neutral connection for the sensor to operate, because many existing buildings do not have a neutral wire in the wall box. The costs of rewiring the box with a neutral connection can be prohibitive and, therefore, most wall box sensors are powered by leakage current from line to ground. This leakage current is limited by code to no more than 500 uA. Sensors used in new construction require a neutral wire.

The use of sensors is increasingly being mandated by state building and energy codes. For example, California Title 24 requires the use of sensors in a specific number of rooms in a house. While sensors can be convenient for the automatic control of lights, they can be inconvenient when multiple points of control are needed. Existing sensors are not designed to accommodate remote control.

Figure 1:
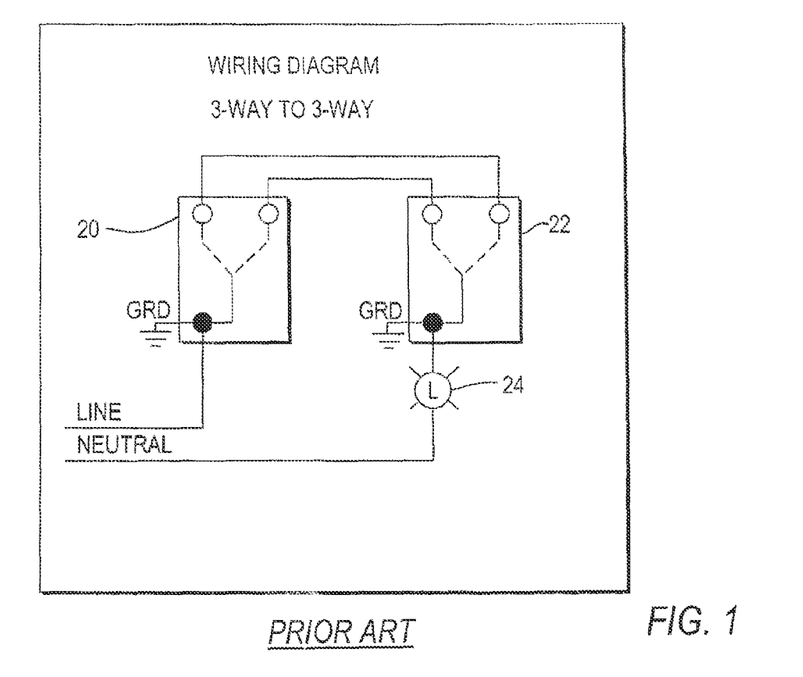
FIG. 1 is a wiring diagram of two 3-way switches coupled together.

There are many situations in a home, especially in new construction, where there may be more than one point of control for lighting in a specific area or room such as a hallway, adjoining bathroom, kitchen, or where there is more than one entryway to the area. Traditional wiring methods using two 3-way mechanical switches, such as the Leviton 5603 switch, was designed for use where one load can be controlled from more than one location as shown in FIG. 1. The three way switch is a two position mechanical switch.

Multiple points of control is a common requirement of wall box dimmers. Dimmers have evolved over time to include this capability, generally in two ways. Dimmers can be divided into two types, electromechanical and digital. Electromechanical dimmers use a mechanical switch to turn the load on and off, and have a controllable semiconductor switch, such as a triac coupled in series to vary power to the load. These dimmers use a simple passive circuit to control the semiconductor switch. Digital dimmers also use a semiconductor switch, but generally use more complex logic, such as an ASIC or a microprocessor to control the switch. Digital dimmers usually do not have a mechanical switch. Instead, they rely on a smaller rated disconnect switch which is only used to provide an air gap for safety purposes.

The electromechanical dimmer can readily accommodate 3-way switching because it incorporates a true mechanical switch. Replacing the standard mechanical switch with a 3-way switch is all that is necessary and the electromechanical dimmer can be used with a standard 3-way switch to provide two points of control. Additionally, a 4-way switch can be used to provide up to 3 points of control. This, however, is the practical limit.

The digital dimmer cannot readily accommodate 3-way switching because it does not use a true electromechanical switch. However, the use of advanced logic, such as a microprocessor, allows a digital dimmer to overcome this limitation. A remote dimmer works well with a digital dimmer, and can provide remote control of the dimmer. The remote dimmer does not provide true 3-way switching, but does provide equivalent and additional functionality. For example, four or more remotes can be used to provide a total of five points of control for the digital dimmer.

A remote dimmer generally includes some switches and diodes and is connected to the dimmer with an additional "traveler" wire, similar to how a 3-way switch is connected to an electromechanical dimmer. It does not do any actual dimming, but acts as a source of information to the dimmer. The remote dimmer sends line voltage pulses to the dimmer which has a microprocessor pin which decodes these signals to indicate both the on/off or dim level and functions.

A digital dimmer provides a display which indicates the state of the load. Traditional remote dimmers have no display. Therefore, a user cannot identify the state of the load or the dim level by looking at a remote dimmer. An additional drawback is that the look of the remote is different than the look of the dimmer because there is no display in the remote dimmer.

To overcome these limitations, advanced remote dimmers have been developed that provide identical display and resembles a dimmer. This is performed by the innovative use of communication between the dimmer and the remote. See U.S. patent application Ser. No. 11/149,365, which is incorporated herein, in its entirety by reference for a disclosure of this technology and of an advanced remote dimmer, a simple remote dimmer and a switch. The advanced remote dimmer, such as that disclosed in U.S. patent application Ser. No. 11/149,365 has the advantage of allowing the use of both simple and advanced remotes together with the same dimmer at the same time. Prior art remote dimmer systems only allow the use of the simple remote dimmer or the advanced remote dimmer. In addition, the system disclosed in U.S. patent application Ser. No. 11/149,365 includes electronic switches which provide on/off control of non-dim loads, as well as the ability to work with both types of remotes, thus exceeding the multiple location control ability of the standard 3-way mechanical switches. The system includes switching remotes (which provides only an on/off control in the user interface) to work with (and match) the electronic switches.

In locations where sensors are required, it is still desirable to have multiple location control, but the design of traditional sensors cannot accommodate this. In addition, many homeowners want to be able to dim the lights at the same locations where the sensors are located. Again, this is not possible with the design of traditional dimmers and occupancy sensors.

When using occupancy sensors to control the lights in an area, it is possible that a single sensor's field of view is not enough to cover the entire area. In this case, it would by desirable to have additional sensors connected together to cover the desired area.

SUMMARY OF THE INVENTION

There is disclosed a sensor which, when integrated into a dimming system, can control lights by turning the dimmer on and off, and vice versa. As an example, lights which are connected to a dimmer can be turned on by using the dimmer, the light level can be adjusted to provide a level of illumination desired by an occupant, and the sensor can turn the lights off when the room is vacant. The sensor here disclosed provides sensing functionality to a dimming system, and the sensors can be remotely controlled by other sensors, dimmers and dimmer remotes.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclose conception and specific embodiment as a basis for designing or modifying other structures for carrying out the same purposes of the present invention. While the present invention is embodied in hardware, alternate equivalent embodiments may employ, whether in whole or in part, firmware and software. Those skilled in the art should also realize that such equivalent constructions do not depart from the spirit and scope of the invention in its broadest form.

BRIEF DESCRIPTION OF THE DRAWINGS

Other aspects, features and advantages of the present invention will become more fully apparent from the following detailed description, the appended claim, and the accompanying drawings in which similar elements are given similar reference numerals where:

DESCRIPTION OF THE PREFERRED EMBODIMENT(S)

The operation of traditional occupancy sensors does not lend itself to coordinating functions between multiple devices. Referring to FIG. 1, two 3-way switches, switch 20 and switch 22 are connected to control a single load, such as light 24. With this 3-way switch arrangement there are four possible inputs as follows:
A) switch 20 is on,
B) switch 20 is off,
C) switch 22 is on,
D) switch 22 is off.
Either switch can turn the light on or off and all of the inputs are directly under the user's control.

When two sensors are used instead of two 3-way switches to control one load, the operation becomes more complicated due to the automatic operation of the sensors. Existing sensors have a toggle button which is used to manually change the state of the lights, but the sensors do not have an LED to indicate the status of the load. They only have an indicator to show whether the sensor has detected motion. With two sensors connected to control one load, where the sensors are Manual On/Automatic Off, or Automatic On/Automatic Off type of sensors, the inputs are as follows:

| Automatic On/Automatic Off type sensor | Manual On/Automatic Off type sensor |
| --- | --- |
| toggle (sensor 1) | toggle (sensor 1) |
| toggle (sensor 2) | toggle (sensor 2) |
| automatic off (sensor 1) | automatic off (sensor 1) |
| automatic off (sensor 2) | automatic off (sensor 2) |
| | automatic on (sensor 1) |
| | automatic on (sensor 2) |

With this arrangement, only two of the inputs are directly under the control of the user.

An approach for providing two location control with two sensors is to wire the load on the two sensors to be in parallel. This is possible in new construction. However, it may not always be possible as a retrofit solution because there may not be a wire which can be used to connect the load to the second electrical box. Even when it is possible to provide a retrofit installation, the operation of the sensors is such that if either of the sensors is on, then the load in on. The sensors must either turn off automatically, or be turned off manually for the lights to be turned off. In addition, to turn the lights off manually, the user must know which sensor is keeping the lights on. Without a blinking LED indicator, the user may not know which sensor's button to press. This is not a true two location control.

Another solution is to provide an occupancy sensor with a traveler wire connected to a standard 3-way mechanical switch. This arrangement will allow the lights to be turned "on" at either location, but the sensors must time out to their off states for the lights to turn off. Again, this is not a practical two location control.

Multiple location control for occupancy sensors can be obtained by providing a means of communication between the sensors. Any communication means should lend itself to the form factor, cost and electrical requirements of a wall box mounted wiring device. One type of communication that satisfies these requirements is the type used in the advanced remote dimmer which allows the sensors to coordinate their functions. In one embodiment here disclosed a sensor and a sensor remote is provided, where the sensor contains sensing circuitry, a user interface, a load control and communication circuitry. The sensor remote has only the sensing circuitry, user interface and the communication circuitry. In another embodiment there is no sensor remote. Additional points of control are handled by the standard sensor, but the load is not connected.

In this description the following definitions pertain:

A typical wall box mounted sensor consists of:
- a sensor with amplification and filtering (or signal processing),
- a microprocessor (can be asic),
- a relay or triac to control the load,
- a visible indicator for the load status and occupancy detection, and
- a line voltage power connection, with a power supply to supply a logic circuit.

A sensor remote consists of all of the above but without the relay or triac for load control.

An advance remote is a wall box mounted device that acts as a remote input to a lighting control which directly controls an electrical load. The advance remote can provide on/off, and/or dim level information to the lighting control to affect the state of the load. It may also have a display to indicate the state of the load.

A single sensor operation is a system of sensors that work together to provide adequate coverage to control a single load;

A 3-way or 4-way switch arrangement is an occupancy sensor that has equivalent and improved function of a 3-way switch, or more;

A dimming system with remotes is a lighting control system with dimmers, sensors and remote control.

Figure 2:
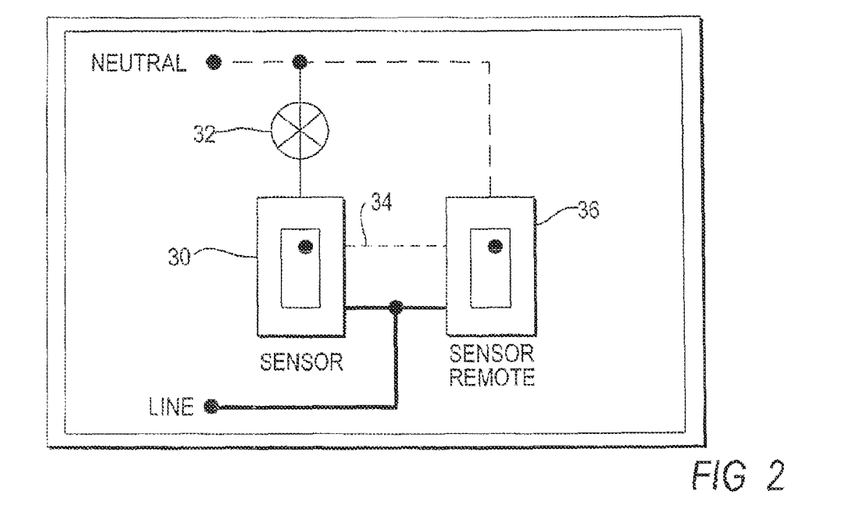
FIG. 2 is a wiring diagram of a sensor and a sensor remote connected to control a single light.

Referring to FIG. 2, there is shown a 3-way sensor application. The operation of the circuit of FIG. 2, where the sensor is a Manual-on sensor, is as follows:
- The button on sensor 30 is pressed, which tells the sensor 30 to turn on the light 32;
- The sensor 30 turns on light 32;
- The sensor 30 sends a message on the traveler conductor 34, telling the other sensor 36, the remote sensor, to turn on;
- The remote sensor 36 receive the message, and places itself to an on state.

When a sensor, either sensor 30 or 36 detects motion, it sends a sync message to tell the other sensor to restart its timeouts. The synch message sent can be based on a period for the purpose of limiting the amount of messages;

When the sensor completes the timeout, it checks for the following:
If it originated the last sync, it turns itself off, and sends a turn off message.
If it receives the last sync, it does nothing and waits for the other sensor to send a turn off signal.

Eventually, all sensors will turn off.

Figure 3:
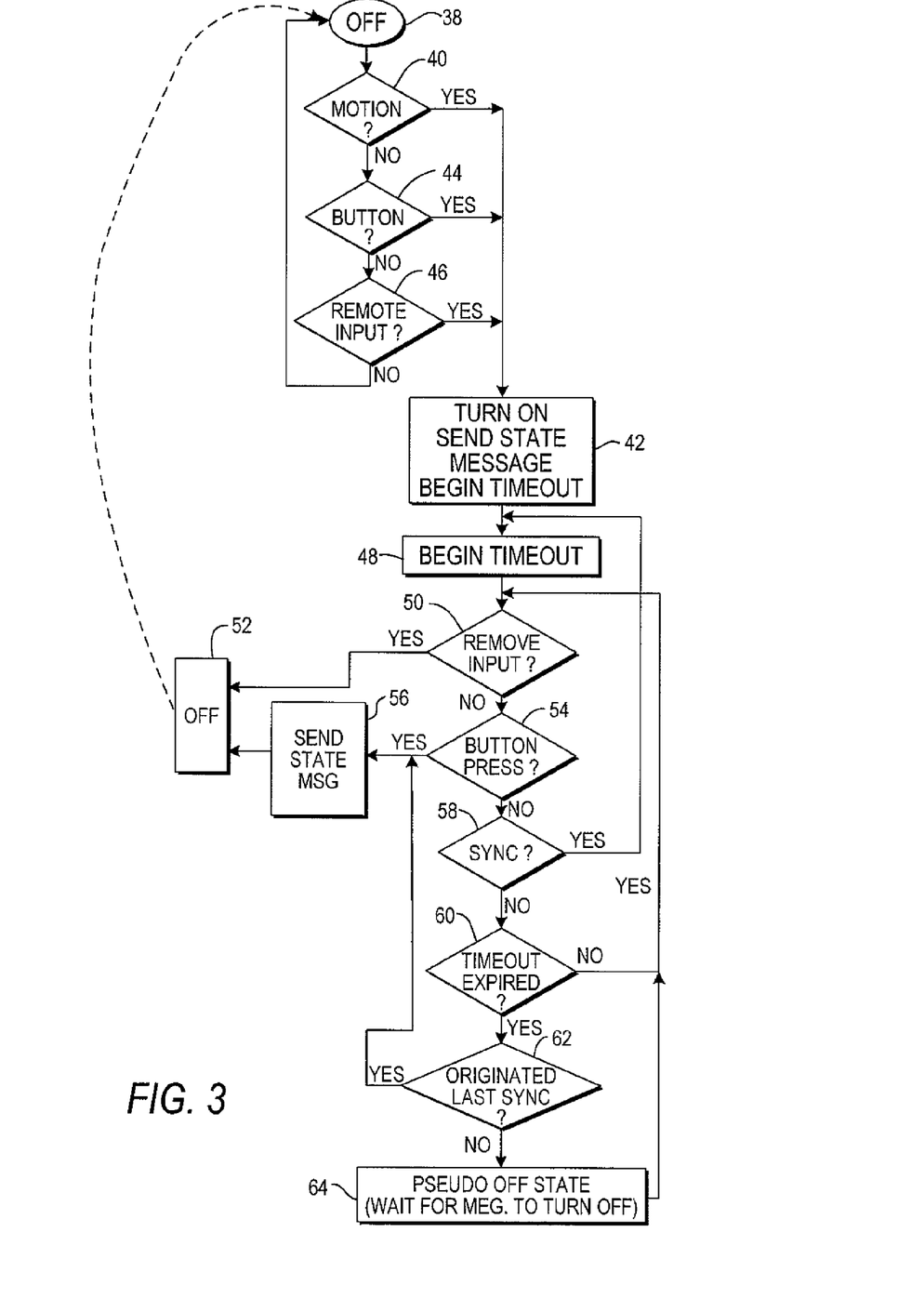
FIG. 3 is a flow chart of the operation of the embodiment shown in FIG. 2.

FIG. 3 is a flow diagram of the operation of a system having a manual on/automatic off type sensor with sync. and remote functionality just described for FIG. 2. Referring now to FIG. 3 in detail, the sensor is in its off state, step 38. If motion is detected by the sensor, step 40, a signal is sent that motion is detected and a signal is generated turn on the light and to begin time out, step 42. At step 48, in response to the received signal, time out begins. If no motion is detected, the system advances to step 44 where, if the button on the sensor is pushed, telling the sensor to turn the light on, a signal is sent to step 42 and the lights are turned on and time out begins, step 48. If, at step 44, the button has not pushed, the system advances to step 46. At this time, if the remote has detected motion, a signal is sent to step 42, the lights are turned on and, at step 48, time out begins. If, however, the remote has not detected motion, the system returns to step 38. Thus, if neither the sensor or the remote sensor has not detected motion and the button on the sensor has not been pushed, the light stays off and system returns to step 38. If, however, either the sensor or the remote sensor detect motion, or the button on the sensor is pushed, the light turns on, step 42, and time out begins, step 48. Going now to step 50, if both the sensor and the remote time out without sensing motion, "yes" in step 50, the system goes to step 52 and the lights are turned off. If, however, at step 50, the remote detects motion before time out ends, "no" in step 50, the lights stay on and the system goes to step 54. At this time, if the button on the sensor is now pressed, the system sends a signal to step 56 which causes the lights which are on to be turned off. If, however, the button on the sensor is not pressed and, at step 58, a sync. signal is received from the remote, a signal is sent to again start time out. If a sync. signal is not received from the remote at step 58, the system advances to step 60 where, if time out has not expired, the system goes back to step 50. If time out has expired and the sensor, not the remote, originated the last sync., step 62, a signal is sent to step 56 and the lights are turned off. If the sensor did not originate the last sync., the system advances to step 64 where it waits for a message to turn off the lights before sending a signal to step 50.

The prior art leakage current to ground power supply used in traditional occupancy sensors will not allow for the proper operation of the invention here disclosed because the prior art leakage to ground power supply does not provide enough current to operate the necessary circuitry. In addition, the power supply for the invention here disclosed should allow for a line voltage connection that is uninterrupted from the line terminal to the DC power supply COMMON connection of the dimmer circuit.

Figure 4:
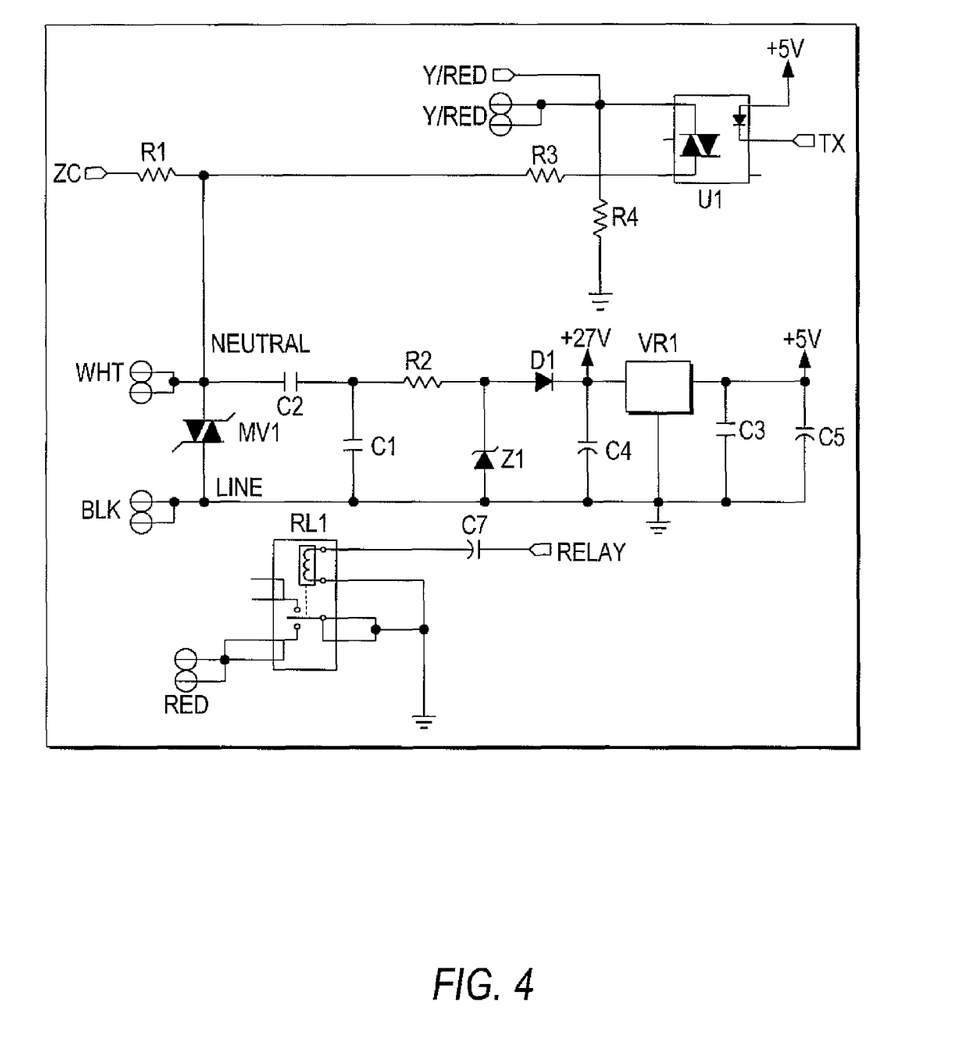
FIG. 4 is a schematic of a power supply for use with the embodiments disclosed.

FIG. 4 shows a schematic of a preferred power supply. Referring to FIG. 4, the terminal Y/RED is connected to the traveler wire between sensors. When one sensor transmits, it uses Optocoupler U1 to connect line to neutral through resistors R3 and R4 to provide a signal that is read by the receivers of each connected sensor. The power supply allows for a clean reference, uninterrupted by varying voltage levels. This circuit also allows for the largest margin for signal identification when the sensor is connected to a dimmer.

Figure 5:
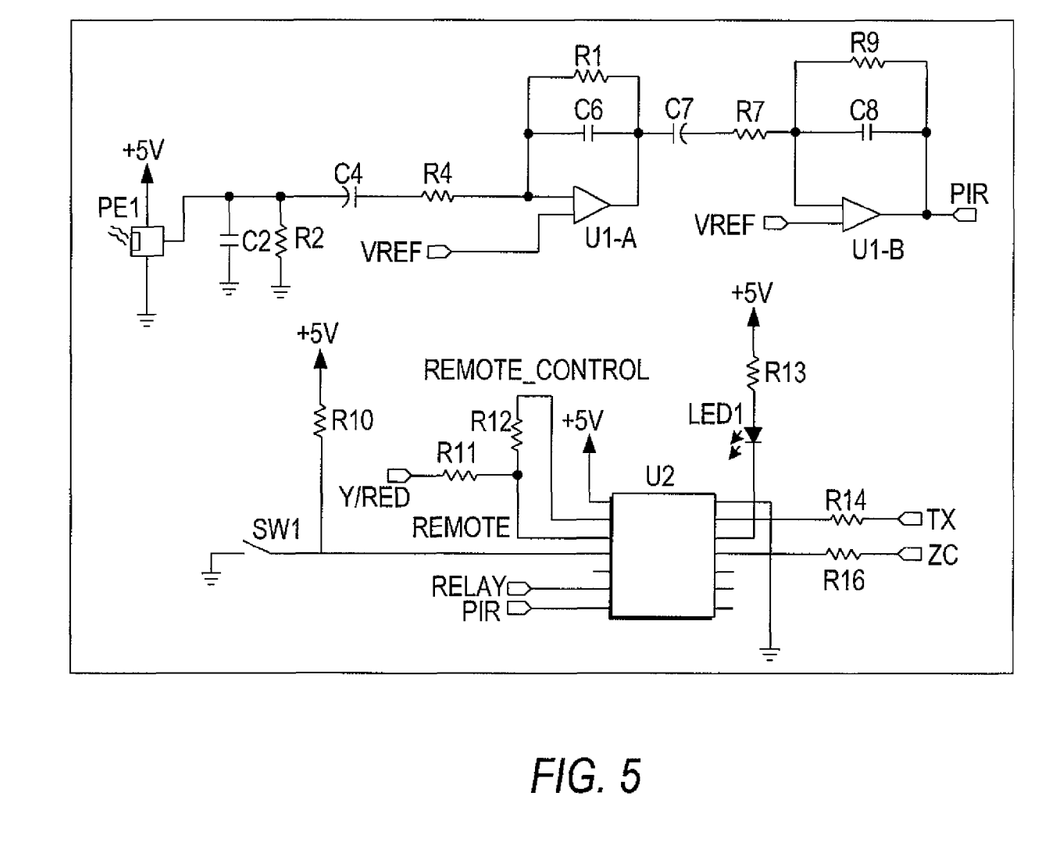
FIG. 5 is a schematic of a sensing and control circuit.

Referring to FIG. 5, the receiver circuit includes resistors R11 and R12 and the micro circuit U2. The receiver decodes the pulses on the traveler wire. As shown in the schematic, the communication is referenced to the phase conductor. An additional feature of the circuit of FIG. 5 is that sensing functionality is incorporated into the dimming system. Advanced remote dimmers exist, (see the patent application identified above and incorporated herein by reference in its entirety) which allow for multiple location remote control of a single load. The load can be controlled by either the dimmer or the remote and the dimmer status can be displayed on either the dimmer or the remote.

The design of the sensor allows for the adding of sensing functionality to the dimming system, and provides sensors which can be remotely controlled by other sensors, dimmers and dimmer remotes.

As here disclosed, with the sensor integrated into the dimming system, the sensor can turn the dimmer on and off, and the dimmer can turn the sensor on and off. For example, the lights can be turned on by using the dimmer, the light level can be adjusted to provide for the user's comfort with the dimmer, and the sensor remote can turn off the lights when the room is vacant.

Figure 6:
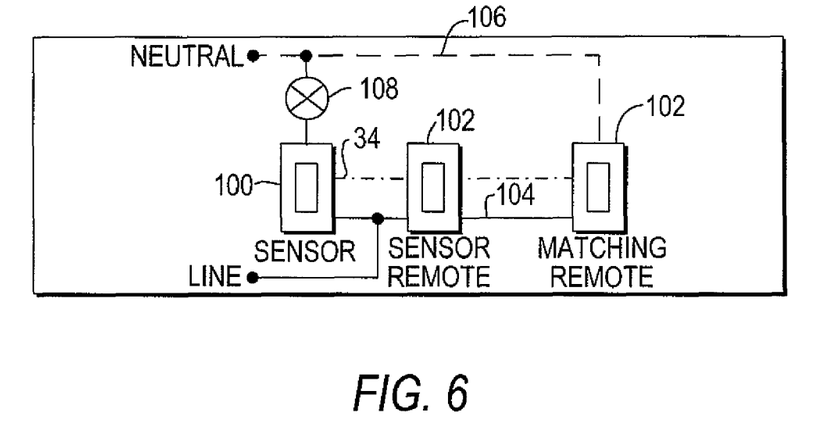
FIG. 6 shows an embodiment where two sensors are integrated into a dimming system for a single load.
Figure 7:
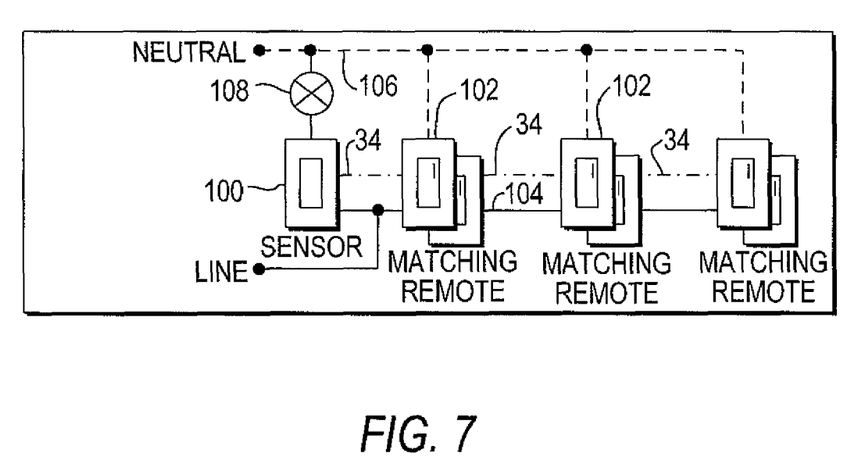
FIG. 7 shows another embodiment using one sensor and one remote for a single load.
Figure 8:
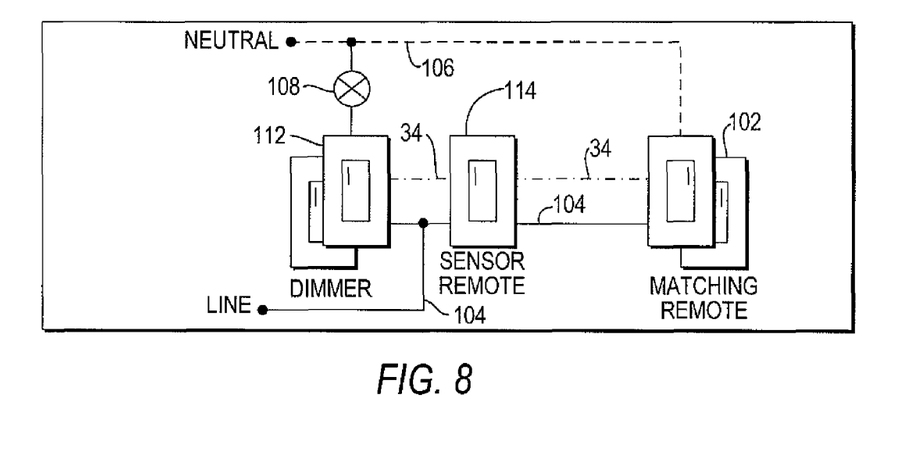
FIG. 8 shows still another embodiment where a sensor is used as a remote control of a dimmer for a single load.

The embodiments shown in FIGS. 6-9 allow both simple and advanced remotes which are used with the dimmers to be used with the sensor. The embodiments shown in FIGS. 6-8 are for single load applications and can include, in one embodiment (FIG. 6) two sensors. In another embodiment (FIG. 7) there is one sensor and one remote. In still another embodiment (FIG. 8) there is a dimmer and sensors.

The embodiment shown in FIG. 6 is when two sensors are used to provide adequate coverage for an entire area. For example, one sensor may not be sufficient because the room maybe too large, or it may be "L" shaped. In this embodiment one sensor is connected to the load, and a second sensor functions as a remote to it. The load terminals of the second sensor are not connected. If desired, switching remotes can be used for additional points of control. In FIG. 6, the sensor 100, and first and second sensor remotes 102 are connected in parallel with traveler wire 34 and the wire 104 connected to the phase terminal of a source of power. The neutral terminal of the source of power is connected via conductor 106 through a load such as a light 108 to sensor 100, and to the remote sensors 102. The load terminals of the first sensor are not connected.

Referring to the embodiment shown in FIG. 7, there is disclosed structure which can be used when the field of view of the sensor is adequate to cover an entire room, but there is a need for an additional point of control, such as a second entry way or door. The sensor 100 is connected through the load 108 to the neutral conductor 106, and the switching remotes are connected directly to the phase conductor 106. The sensor 100 and the switching remotes are connected in parallel across the traveler wire 34 and the phase conductor 104.

The embodiment shown in FIG. 8 is when the sensor is used as a remote control of the dimmer and the dimmer is connected to the load. This provides both an additional point of on/off manual control, as well as automatic turn off. In this embodiment one or more dimmers 112, one or two sensor remotes 114 and one or more matching remotes 102 are connected in parallel to traveler conductor 34 and phase conductor 104. The neutral conductor 106 is connected through load 108 such as a lamp circuit to one or more dimmers 112 and directly to the matching remote 102. Any combination of dimmers, sensors and remotes can be used.

Figure 9:
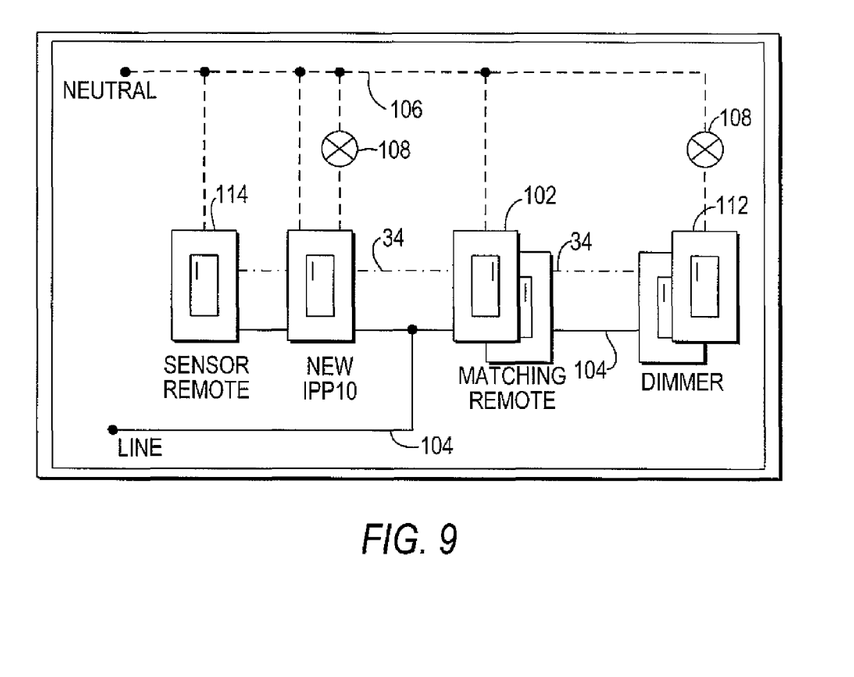
FIG. 9 shows still another embodiment where two independent loads are operated as one.

Referring to FIG. 9, there is disclosed structure for coordinating the control of two loads with a dimmer and a sensor, or with two dimmers where control of the loads is coordinated and operate as one, i.e. they both turn on together, and they both turn off together. A sensor is connected to a non-dim load, and a dimmer is connected to a dimmable load. The sensor and dimmer coordinate their operation so the two loads turn on and off together, Additional sensors can be used as remotes, without their load wires attached, as well as additional matching or coordinating remotes.

In a further embodiment of this invention the sensors LEDs are coordinated with that of the dimmers. Each sensor can have an LED that displays both motion detection information and load status information, as follows:
  Lights OFF and No motion detection—LED is lit (locator function);
  Lights OFF and motion detection—LED blinks;
  Lights ON and no motion detection—LED off;
  Lights ON and motion detection—LED blinks.
In this description, it is understood that:

A wall mounted sensor can comprise:
  a sensor with amplification and filtering (or signal processing);
  a microprocessor (can be asic);
  a relay or triac to control load;
  a visible indicator for load status and occupancy detection;
  a line voltage power connection, with power supply to supply logic.

A sensor remote is the sensor above without the relay or triac for load control.

An advanced remote is a wall box mounted device that acts as a remote input to a lighting control which directly controls an electrical load. The remote can provide on/off or dim level information to the lighting control to affect the state of the load. It can also have a display to indicate the state of the load.

While there have been shown and described and pointed out the fundamental novel features of the invention as applied to the preferred embodiments, it will be understood that various omissions and substitutions and changes of the form and details of the method and apparatus illustrated and in the operation may be done by those skilled in the art, without departing from the spirit of the invention.

What is claimed is:

1. A lighting control system for controlling at least one light circuit in a room, comprising:
  a first sensor; and
  a second sensor coupled to said first sensor with a line voltage communication link; wherein said first sensor and said second sensor act together to provide power to at least one light circuit upon detection of occupancy in an area by either of said sensors.

2. The lighting control system of claim 1 wherein said first sensor is a wall box occupancy sensor.

3. The lighting control system of claim 2 wherein said wallbox occupancy sensor has an amplification and filtering circuit, a microprocessor, a load control device, and a visible indicator to indicate occupancy detection.

4. The lighting control system of claim 3 wherein said remote sensor has an amplification and filtering circuit, a microprocessor and a visible indicator to indicate occupancy detection and further comprising:
  a dimmer coupled to said wall box occupancy sensor and said remote sensor via the line voltage communication link.

5. The lighting control system of claim 4 further comprising:
  a second dimmer coupled to said wail box occupancy sensor, said remote sensor and said first dimmer via the line voltage communication link wherein manual and automatic on-off control and multiple location dimming control of a single light circuit is provided.

6. The lighting control system of claim 4 further comprising:
  a second dimmer coupled to said wall box occupancy sensor, said remote sensor and said first dimmer via the line voltage communication link wherein manual and automatic on off control and multiple location dimming control of a single light circuit is provided.

7. The lighting control system of claim 4 further comprising:
  a second dimmer coupled to said wall box occupancy sensor, said remote sensor and said first dimmer via the line voltage communication link wherein manual and automatic on off control and multiple location dimming control of two discrete lighting circuits are controlled as a single light circuit.

8. The lighting control system of claim 1 wherein said second sensor is a remote sensor.

9. The lighting control system of claim 8 wherein said first sensor and said remote sensor are each coupled to control the at least one light circuit to provide multiple location automatic on off control to the at least one light circuit.

10. The lighting control system of claim 9 wherein one dimmer is coupled to provide dimming to the at least one light circuit.

11. The lighting control system of claim 8 comprising first and second dimmers coupled to provide multiple location dimming to at least one light circuit.

12. The lighting circuit of claim 11 wherein at least one of said dimmers has manual on off controls to manually provide power to the at least one light circuit and interrupt power to the at least one light circuit.

13. The lighting circuit of claim 12 wherein said at least one light circuit comprises two light circuits that operate as a single light circuit.

14. The lighting circuit of claim 11 wherein said dimmers are manually on automatic off dimmers.

15. The lighting circuit of claim 11 wherein said dimmers are automatic on off dimmers.

16. The lighting control system of claim 8 wherein said remote sensor has an amplification and filtering circuit, a microprocessor, and a visible indicator to indicate occupancy detection.

17. The lighting control system of claim 8 wherein said first and/or second sensor is of the automatic on automatic off type.

18. The lighting control system of claim 8 wherein said first and/or second sensor is of the manual on automatic off type.

19. The lighting control system of claim 1 wherein said first sensor is a wall box occupancy sensor and said second sensor is a remote sensor.

20. The lighting control system of claim 1 wherein said first sensor is an ultrasonic sensor.

21. The lighting control system of claim 1 wherein said first sensor is an acoustical sensor.

22. The lighting control system of claim 1 wherein said first sensor is a microwave sensor.

23. The lighting control system of claim 1 wherein said voltage communication link comprises phase and neutral line voltage conductors.

24. The lighting control system of claim 23 wherein said neutral is connected directly to said sensors.

25. The lighting control system of claim 23 wherein said neutral is connected through said at least one lighting circuit to said sensors.

26. A lighting control system for controlling at least one light circuit having at least two loads comprising:
   a sensor coupled to provide power to a first load;
   a dimmer having a manual on-off control coupled to control a second load and coupled to said sensor with a two way line voltage communication link wherein said sensor, upon detection of occupancy in an area, provides power to said first and second loads.

27. The lighting control system of claim 26 wherein said dimmer is coupled to interrupt power to said first and second loads upon being manually set to its off condition.

28. The lighting control system of claim 26 wherein said dimmer is coupled to provide power to said first and second loads upon being manually set to its on condition.

29. The lighting control system of claim 26 wherein said sensor is an automatic on-automatic off sensor.

30. The lighting control system of claim 26 wherein said sensor is a manual on automatic off sensor.

\* \* \* \* \*